United States Patent
Arad et al.

(10) Patent No.: US 9,781,018 B2
(45) Date of Patent: Oct. 3, 2017

(54) TIME EFFICIENT COUNTERS AND METERS ARCHITECTURE

(71) Applicant: MARVELL WORLD TRADE LTD., St. Michael (BB)

(72) Inventors: Carmi Arad, Nofit (IL); Kurt Thomas Boden, Strangnas (SE); Gil Levy, Hod Hasharon (IL); Jakob Carlstrom, Uppsala (SE)

(73) Assignee: Marvell World Trade Ltd., St. Michael (BB)

( * ) Notice: Subject to any disclaimer, the term of this patent is extended or adjusted under 35 U.S.C. 154(b) by 93 days.

(21) Appl. No.: 14/269,664

(22) Filed: May 5, 2014

(65) Prior Publication Data
US 2014/0328196 A1    Nov. 6, 2014

Related U.S. Application Data

(60) Provisional application No. 61/819,081, filed on May 3, 2013.

(51) Int. Cl.
*H04L 12/26* (2006.01)
*H04L 12/819* (2013.01)
*H04L 12/24* (2006.01)

(52) U.S. Cl.
CPC .......... *H04L 43/024* (2013.01); *H04L 41/147* (2013.01); *H04L 43/0876* (2013.01);
(Continued)

(58) Field of Classification Search
None
See application file for complete search history.

(56) References Cited

U.S. PATENT DOCUMENTS 7,304,994 B2 * 12/2007 Dubnicki ................ H04L 29/06
                                                              370/392
7,936,687 B1 *  5/2011 Parker ..................... H04L 12/56
                                                              370/252
(Continued)

FOREIGN PATENT DOCUMENTS

EP         2 490 379 A1     8/2012

OTHER PUBLICATIONS

Jurga et al. "Technical Report: Packet Sampling for Network Monitoring" , Dec. 10, 2007, retrieved from https://openlab-muinternal.web.cern.ch/openlab-mu-internal/03_Documents/3_Technical_Documents/Technical_Reports/2007/RJ-MM_SamplingReport.pdf, on May 5, 2016.*
ITU-T Recommendation Y.1564, "Ethernet service activation test methodology," *Int'l Telecommunication Union*, pp. 1-38 (Mar. 2011).
(Continued)

*Primary Examiner* — Jung Park
*Assistant Examiner* — Jamaal Henson

(57) ABSTRACT

A network device includes a plurality of interfaces configured to receive, from a network, packets to be processed by the network device. A load determination circuit of the network device is configured to determine whether a packet traffic load of the network device is above a traffic load threshold, and a dual-mode counter module is configured to (i) determine a count of quanta associated with the received packets using a first counting mode in response to the load determination unit determining that the packet traffic load is above the traffic load threshold, and (ii) determine a count of quanta associated with the received packets using a second counting mode, different than the first counting mode, in response to the load determination unit determining that the packet traffic load is not above the traffic load threshold.

25 Claims, 6 Drawing Sheets

(52) U.S. Cl.
CPC ............ *H04L 43/16* (2013.01); *H04L 47/215* (2013.01); *H04L 43/02* (2013.01)

(56) References Cited

U.S. PATENT DOCUMENTS

| | | | |
|---|---|---|---|
| 2002/0152306 A1* | 10/2002 | Tuck, III | H04L 12/5602 709/224 |
| 2004/0184404 A1 | 9/2004 | Carpenter et al. | |
| 2004/0184444 A1* | 9/2004 | Aimoto | H04L 47/10 370/352 |
| 2004/0203559 A1* | 10/2004 | Stojanovic | H04L 25/497 455/403 |
| 2004/0228197 A1 | 11/2004 | Mokhlesi | |
| 2005/0226201 A1 | 10/2005 | McMillin | |
| 2006/0182112 A1* | 8/2006 | Battle | H04L 12/18 370/392 |
| 2008/0002685 A1* | 1/2008 | Joo | H04L 47/10 370/389 |
| 2008/0177756 A1* | 7/2008 | Kosche | G06F 11/3447 |
| 2009/0257352 A1* | 10/2009 | Imai | H04L 43/024 370/241 |
| 2010/0150163 A1* | 6/2010 | Ahn | H04L 12/12 370/401 |
| 2010/0157809 A1 | 6/2010 | Duffield et al. | |
| 2011/0149794 A1 | 6/2011 | Kim et al. | |
| 2011/0310851 A1 | 12/2011 | Klingenbrunn et al. | |
| 2012/0057601 A1 | 3/2012 | Voruganti et al. | |
| 2013/0166730 A1* | 6/2013 | Wilkinson | H04L 41/142 709/224 |
| 2013/0185343 A1* | 7/2013 | Arad | H04L 49/90 708/200 |
| 2014/0029423 A1 | 1/2014 | Badhani et al. | |

OTHER PUBLICATIONS

MEF 10.2 Technical Specification, "Ethernet Services Attributes Phase 2," *The Metro Ethernet Forum 2009*, pp. 1-65 (Oct. 27, 2009).
MEF 10.3 Technical Specification, "Ethernet Services Attributes Phase 3," *The Metro Ethernet Forum 2009*, pp. 1-120 (Oct. 2013).
Heinanen, J., et al., RFC 2697, "A Single Rate Three Color Marker," *The Internet Society*, pp. 1-6 (Sep. 1999).
Heinanen, J., et al., RFC 2698, "A Two Rate Three Color Marker," *The Internet Society*, pp. 1-5 (Sep. 1999).
U.S. Appl. No. 13/773,930, filed Feb. 22, 2013, 17 pages.
U.S. Appl. No. 13/898,942, filed May 21, 2013, 24 pages.
International Search Report and Written Opinion in PCT/IB2014/001750, dated Dec. 4, 2014 (12 pages).
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages. (May 1, 2002).
"Approximate Counting Algorithm," Wikipedia, http://en.wikipedia.org/wiki/Approximate_counting_algorithm, retrieved Jan. 17, 2013 (3 pages).
Stanojevic, "Small Active Counters," *IEEE Infocom Proceedings*, 9 pages. (May 2007).
International Preliminary Report on Patentability in International Application No. PCT/IB2014/001750, mailed Nov. 12, 2015 (9 pages).
Non-Final Office Action in U.S. Appl. No. 13/744,093 mailed Oct. 30, 2015 (10 pages).
Non-Final Office Action in U.S. Appl. No. 13/744,093 mailed May 4, 2015 (11 pages).

* cited by examiner

TIME EFFICIENT COUNTERS AND METERS ARCHITECTURE

CROSS-REFERENCE TO RELATED APPLICATION

This claims the benefit of U.S. Provisional Patent Application No. 61/819,081, entitled "Time Efficient Counters and Meters Architecture" and filed on May 3, 2013, the disclosure of which is hereby incorporated herein by reference.

FIELD OF TECHNOLOGY

The present disclosure relates generally to counters and meters and, more particularly, to counters and meters utilized in communication networks.

BACKGROUND

Communication networks typically employ network devices, such as switches, bridges and routers, that perform operations requiring knowledge of event counts (e.g., packet counts and/or packet byte counts) associated with network traffic. To reduce area and/or power consumption, some network switches use counters that store count values in a relatively inexpensive memory, such as dynamic random access memory (DRAM) or static random access memory (SRAM). As the number of events to be counted in a given time interval increases, however, the counter memory update rates may be too slow to provide an exact count of the events in real time. Thus, counter memory updates can cause a bottleneck with respect to applications that require fast counting. The average rate at which the counter memory needs to be updated can be reduced using statistical estimation techniques, which may be suitable for metering or other applications that do not require exact counting, and which also generally reduce memory space/area.

SUMMARY

In an embodiment, a network device comprises a plurality of interfaces configured to receive, from a network, packets to be processed by the network device. The network device also comprises a load determination circuit configured to determine whether a packet traffic load of the network device is above a traffic load threshold, and a dual-mode counter module configured to (i) determine a count of quanta associated with the received packets using a first counting mode in response to the load determination unit determining that the packet traffic load is above the traffic load threshold, and (ii) determine a count of quanta associated with the received packets using a second counting mode, different than the first counting mode, in response to the load determination unit determining that the packet traffic load is not above the traffic load threshold.

In another embodiment, a method for counting events in a network device includes receiving, from a network, packets to be processed by the network device, and determining whether a packet traffic load in the network device is above a traffic load threshold. The method also includes responsively to determining that the packet traffic load is above the traffic load threshold, determining a count of quanta associated with the received packets using a first counting mode, and responsively to determining that the packet traffic load is not above the traffic load threshold, determining a count of quanta associated with the received packets using a second counting mode different than the first counting mode.

In yet another embodiment, a network device comprises a plurality of interfaces configured to receive, from a network, packets to be processed by the network device, and a counter module configured to estimate, using a statistical sampling operation, a count of quanta associated with packets received via the plurality of interfaces, the statistical sampling operation being performed according to a control parameter that is based on a bandwidth metric of the network device.

In still another embodiment, a method for counting events in a network device includes receiving, from a network, packets to be processed by the network device, and estimating, using a statistical sampling operation performed according to a control parameter that is based on a bandwidth metric of the network device, a count of quanta associated with the received packets.

In another embodiment, a meter module for use in a network comprises a conformance unit configured to access a conformance memory storing a conformance indicator that indicates whether a permitted rate of packet traffic has been exceeded, and classify packets received at the network device based at least in part on the conformance indicator. The meter module also comprises a sampling unit configured to, responsively to the conformance unit classifying the packets, sample events associated with at least some of the received packets, and provide indicators of the sampled events. Additionally, the meter module comprises an update unit configured to access a token bucket memory to update, at least based on the indicators of the sampled events, a number of tokens stored in the token bucket memory, the token bucket memory being separate from the conformance memory, and access the conformance memory to update the conformance indicator when the updated number of tokens indicates that the permitted rate of packet traffic has been exceeded.

In yet another embodiment, a method for metering traffic in a network device includes accessing a conformance memory storing a conformance indicator that indicates whether a permitted rate of packet traffic has been exceeded, and classifying packets received at the network device based at least in part on the conformance indicator. The method also includes responsively to the conformance unit classifying the packets, sampling events associated with at least some of the received packets, and providing indicators of the sampled events. The method further includes accessing a token bucket memory to update, at least based on the indicators of the sampled events, a number of tokens stored in the token bucket memory, the token bucket memory being separate from the conformance memory, and accessing the conformance memory to update the conformance indicator when the updated number of tokens indicates that the permitted rate of packet traffic has been exceeded.

DETAILED DESCRIPTION

In some embodiments described below, statistical sampling is used to estimate, with low error, events occurring at rates higher than the maximum counter memory update rate. In one such embodiment, the estimation error is generally reduced by using statistical sampling for relatively high-load conditions, and instead using deterministic sampling for relatively low-load conditions, which typically are much more common. In some embodiments, the estimation error is further (or instead) reduced by using specialized sampling policies and update policies. In some embodiments, for example, the sampling probability and counter increment amount are based on a control parameter that can be set to minimize or otherwise reduce estimation error while still ensuring that the maximum counter memory update rate is not exceeded (or is very rarely exceeded) even as the maximum bandwidth of a network device (e.g., a router, etc.) is approached. In an embodiment, the sampling probability and the counter increment amount are also based on the lengths of packets associated with counted events, to take advantage of the fact that longer packet lengths typically correspond to lower event rates.

In other embodiments described below, a meter module of a network device includes a conformance memory, storing meter conformance states, that is separate from the meter memory storing token buckets. In some embodiments, the counting/estimation techniques introduced above are used to reduce estimation error in the counts (i.e., in the number of tokens removed). In one embodiment, as a result of these counting/estimation techniques, only the relatively small conformance memory need be accessed at a very fast rate (e.g., greater than or equal to a maximum bandwidth of the network device), while the relatively large meter memory is an inexpensive memory having a relatively slow access/update rate.

Figure 1:
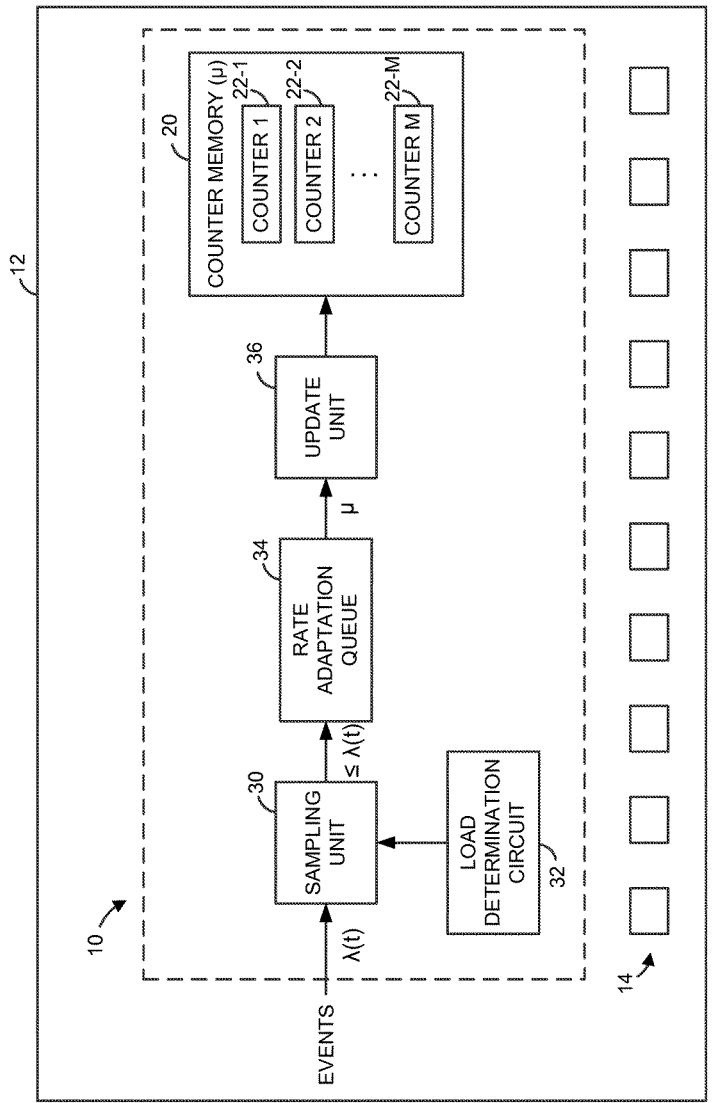
FIG. 1 is a block diagram of an example dual-mode counter module that utilizes probabilistic and deterministic counting techniques of the present disclosure, according to an embodiment.

FIG. 1 is a block diagram of an example dual-mode counter module 10 that utilizes counting techniques of the present disclosure, according to an embodiment. While generally referred to herein as a "counter" module, it is noted that, in at least some scenarios, dual-mode counter module 10 estimates a count rather than providing an exact count, and in certain embodiments does not provide an exact count under any scenarios at all, as will become clear from the description that follows. The dual-mode counter module 10 is disposed within a network device 12, which generally connects two or more computer systems, network segments, subnets, or the like. In various embodiments, the network device 12 is a router device, a bridge device, a switch device, a packet processor, a network processor, or any other suitable network device configured to operate within a networked environment.

The network device 12 also includes a plurality of interfaces 14. Generally, in some embodiments, interfaces 14 include physical, virtual and/or logical interfaces, such as physical ports, virtual ports, tunnel interfaces, etc. In some embodiments, at least some of the interfaces 14 are bidirectional ports that can act as either ingress ports or an egress ports. In other embodiments, some or all of the interfaces 14 are ports that are dedicated to be either ingress ports or egress ports. While FIG. 1 shows ten interfaces, in other embodiments network device 12 includes a suitable number of interfaces different than ten, e.g., more than ten interfaces or fewer than ten interfaces.

The dual-mode counter module 10 is generally configured to determine, substantially in real-time, a count of quanta associated with packets received via interfaces 14 using at least two counting modes that correspond to different sampling and/or update policy modes. In various embodiments, the counts determined by dual-mode counter 10 are counts of the number of packets received, the number of bytes in the received packets, the number of blocks of bytes in the received packets, etc. In at least some scenarios and/or conditions, dual-mode counter module 10 determines the count of quanta by estimating the count rather than providing an exact count. The dual-mode counter 10 stores data representing the determined count values in a counter memory 20, which includes an array of M counters 22-1 through 22-M. In an embodiment, the counter memory 20 is a single physical memory. In other embodiments, the counter memory 20 comprises multiple physical memories. In various embodiments, counter memory 20 is a DRAM, an SRAM (e.g., an embedded SRAM), or any another suitable memory, and can reliably handle updates to the counter array at rates up to a maximum update rate $\mu$ (e.g., $10^7$ event updates per second, $4 \times 10^7$ updates per second, $10^8$ updates per second, etc.). While generally referred to herein as a "maximum" update rate, it is noted that, in some embodiments, $\mu$ is a rate somewhat lower than the true maximum update rate that the counter memory 20 can handle (e.g., $\mu$ is an update rate that provides a particular level of reliability, etc.). In one embodiment, each of counters 22-1 through 22-M is associated with (counts/estimates) a different packet flow.

In one embodiment, each of counters 22-1 through 22-M stores a value that is an exact representation of a count value. In other embodiments, each of counters 22-1 through 22-M stores a value that is an inexact representation of the count value in order to conserve memory space. In various embodiments, for example, each of counters 22-1 through 22-M stores a truncated count value, or stores a mantissa and exponent representing the count value. Examples of counters storing mantissa/exponent count values are provided in U.S. application Ser. No. 13/744,093, entitled "Space Efficient Counters for Network Devices" and filed on Jan. 17, 2013, the disclosure of which is hereby incorporated herein by reference. In some embodiments, overflow is reduced or eliminated for each of counter 22-1 through 22-M by periodically dumping the counter values to a large store, and/or by limiting the measurement time interval over which counting/estimation occurs.

The dual-mode counter 10 also includes a sampling unit 30 configured to selectively sample, or to selectively not sample, each of a number of "events." In some embodiments, each "event" corresponds to the arrival of a different packet that is received via one of interfaces 14. In other embodiments, each event corresponds to a different type of occurrence, such as the dropping of a packet, a packet being mirrored, etc. In an embodiment, sampling unit 30 is configured to selectively sample the events either in a statistical mode (according to some probability P that is less than one), or in a deterministic mode (e.g., sampling every event, or sampling every tenth event, etc., with probability one).

Conditions for using a statistical sampling mode versus a deterministic sampling mode are described below, according to various embodiments.

In FIG. 1, the instantaneous rate at which events arrive (the "event rate") is represented by the variable $\lambda(t)$. In some embodiments, the maximum value of $\lambda(t)$ ($\lambda_{max}$, which may or may not be reached during operation, depending on network conditions) is greater than the maximum update rate $\mu$ of counter memory 20. In other embodiments, however, $\lambda(t)$ is simply a fixed rate that is higher than the maximum update rate $\mu$ of counter memory 20. In some embodiments where $\lambda(t)$ is time-varying, the maximum value of $\lambda(t)$ corresponds to the maximum bandwidth of the network device 12. In one embodiment, for example, the maximum value of $\lambda(t)$ is equal to the sum of the maximum rates for all ingress ports (e.g., of interfaces 14) of network device 12.

In scenarios where sampling unit 30 operates in a statistical sampling mode, sampling unit 30 translates the event rate $\lambda(t)$ to an output rate that is generally less than $\lambda(t)$, with the average output rate generally decreasing as the sampling probability P decreases. Over short time intervals, however, the output rate can occasionally be the same as the event rate $\lambda(t)$. For a given time interval T in which 100 events are received, for example, and assuming that the sampling probability P is greater than zero, there is a non-zero chance that all 100 events will be sampled by sampling unit 30, and that the sampled event rate will therefore be equal to $\lambda(t)$ over the time interval T, in some embodiments.

Dual-mode counter module 10 also includes a load determination circuit 32 configured to monitor a traffic load corresponding to counter memory updates. In some embodiments, the current traffic load is used by sampling unit 30, as will be described further below. In an embodiment, load determination circuit 32 stores the current state of the traffic load in a load state memory (e.g., DRAM, SRAM, or another suitable memory), not seen in FIG. 1, that is within, or otherwise accessible to, load determination circuit 32. In various embodiments, the traffic load state is one of two possible states (e.g., "light" or "heavy" traffic load), one of three possible states (e.g., "light," "medium" or "heavy" traffic load), or one of more than three possible states. Moreover, in various embodiments, load determination circuit 32 determines the traffic load based on metering of the event rate $\lambda(t)$, based on a metric that reflects the rate of sampled events, and/or in another suitable manner. In one embodiment where load determination circuit 32 monitors the traffic load based on metering of the event rate $\lambda(t)$, a single meter operating at the maximum event rate $\lambda_{max}$ is used to monitor the event rate prior to sampling. In an embodiment, the meter determines that the events are conforming when the event rate $\lambda(t)$ is less than the maximum update rate $\mu$, and non-conforming when the event rate $\lambda(t)$ is greater than the maximum update rate $\mu$, and load determination circuit 32 determines whether the traffic load state is "light" or "heavy" based on whether the meter indicates a conforming or non-conforming state.

In an embodiment, sampling unit 30 provides the sampled events to a rate adaptation queue 34, which stores the sampled events before providing the sampled events to an update unit 36. In some embodiments, each sampled event is stored in rate adaptation queue 34 along with other associated information, such as a size associated with the sampled event (e.g., in one embodiment where each event is the arrival of a new packet, information representing a byte count of the packet), for example. As described further below, in some embodiments, the size of each event is used to determine the sampling probability prior to the event being stored in rate adaptation queue 34, and/or is used to determine the counter update amount/increment after the event is stored in rate adaptation queue 34. As another example, in some embodiments, each sampled event is also (or instead) stored with an identifier of the counter (of counters 22-1 through 22-M) that is to be updated based on the sampled event. In an embodiment, the counter identifier corresponds to a flow with which a packet is associated. In one embodiment, for example, network device 12 includes a packet classification unit, not seen in FIG. 1, that classifies received packets based on packet header information (e.g., addresses, virtual local area network (VLAN) tag information, etc.) and/or other information (e.g., an interface, of interfaces 14, via which the packet was received, etc.), and the classification information is used by update unit 36 to select the counter, of counters 22-1 through 22-M, that is to be updated. As yet another example, in some embodiments, each sampled event is also (or instead) stored with an indication of the sampling mode (e.g., statistical or deterministic, in an embodiment) that was used to sample the event. In some embodiments, the sampling mode is used by the update unit 36 to determine which counter increment to apply, as will be described further below.

As explained above, the sampled rate that is output by sampling unit 30 may at times be equal to (or close to) the event rate $\lambda(t)$, even when sampling unit 30 uses statistical sampling, in some embodiments. By queuing the sampled events in rate adaptation queue 34 using a suitably long queue size (and/or multiple, parallel queues), in an embodiment, short term peaks in the sampled event rate that rise above the maximum update rate $\mu$ do not necessarily cause any sampled events to go uncounted (e.g., to be dropped by rate adaptation queue 34). In one embodiment, rate adaptation queue 34 always provides sampled events to update unit 36 at the rate $\mu$, so long as at least one sampled event remains queued.

As noted above, the traffic load monitored by load determination circuit 32 is, in some embodiments, determined based on a metric that reflects the rate of sampled events. In one such embodiment, load determination circuit 32 determines the traffic load by monitoring the fill-level of rate adaptation queue 34. In one such embodiment, a traffic load threshold $T_{TL}$ corresponds to a particular queue fill-level within rate adaptation queue 34, and load determination circuit 32 determines that queue fill-levels below (or less than or equal to) $T_{TL}$ correspond to "light" load conditions while queue fill-levels above (or greater than or equal to) $T_{TL}$ correspond to "heavy" load conditions. In some embodiments, load determination circuit 32 determines the current load conditions according to two thresholds by using hysteresis (e.g., only changing the load state from light to heavy if the queue fill-level increases above an "on" threshold, and only changing from heavy to light if the queue fill-level decreases below a lower, "off" threshold).

In response to receiving and/or detecting a sampled event that is queued in rate adaptation queue 34, update unit 36 causes the appropriate one of counters 22-1 through 22-M to increment according to an amount dictated by the update policy, in an embodiment. As noted above, in an embodiment, update unit 36 determines which of counters 22-1 through 22-M to update based on a counter identifier stored with the event in rate adaptation queue 34.

Because the event rate $\lambda(t)$ can exceed the maximum update rate g of counter memory 20, sampling unit 30 implements statistical sampling in at least some scenarios and/or conditions. In various embodiments, however, dual-mode counter module 10 provides better control over the estimation error than is typically available with conventional statistical counters by implementing specialized policies at sampling unit 30 and/or at update unit 36. Two such techniques will now be described, according to various embodiments.

According to a first technique, in an embodiment, the sampling unit 30 reduces estimation error by using deterministic sampling, rather than statistical sampling, when the network device 12 is experiencing a relatively light traffic load. Because deterministic sampling of every event avoids the estimation error introduced by statistical sampling, and because light traffic conditions are typically much more common than heavy traffic conditions, this technique substantially reduces the estimation error caused by statistical sampling, in an embodiment. In an embodiment, sampling unit 30 determines whether to use statistical or deterministic sampling based on the current state of the traffic load as determined by load determination circuit 32. In an embodiment, sampling unit 30 uses deterministic sampling to sample every event (or to sample one event every x events, etc.) when the load state corresponds to a relatively light load, and uses statistical sampling to sample events (with some probability P that is less than one but greater than zero) when the load state corresponds to a relatively heavy load. In other embodiments, sampling unit 30 is configured to selectively operate according to any one of three or more sampling modes (e.g., a first statistical sampling mode sampling with sampling probability $P_1$, a second statistical sampling mode sampling with a lower sampling probability $P_2$, and a deterministic sampling mode), with the sampling mode being selected based on the traffic load state as detected by load determination circuit 32.

According to a second technique, in an embodiment, the sampling unit 30 reduces estimation error by sampling events with a sampling probability P that is dependent on the size of the sampled events. In one embodiment where an event is the arrival of a packet, for example, the event size is a byte count of the packet. Further, in some embodiments, the sampling probability P is dependent on a control parameter Q. In various embodiments, Q is fixed, or is dynamically calculated (e.g., based on the traffic load determined by load determination circuit 32). Generally, in some embodiments, Q is a quantum that controls both the sampling rate and the estimation error. In one embodiment, for example, sampling unit 30 samples events according to a sampling probability P as follows:

$$P=(L/Q, L/Q<1) \text{ or } (1, \text{otherwise}), \quad \text{(Equation 1)}$$

where L is the event size (e.g., packet byte count). In an embodiment, if the load is low (according to the load determination circuit 32) then all packets are sampled. An indication is passed to a packet length estimator (not shown) for packet length estimation. In some embodiments, L represents an estimated packet length. In some embodiments in which the first technique is used in conjunction with the second technique, P is equal to L/Q only if both L/Q is less than one and the current load state determined by load determination circuit 32 corresponds to a heavy traffic load, and is equal to one (e.g., deterministic sampling) otherwise. When using the sampling policy corresponding to Equation 1, it is seen that a larger value of Q increases the estimation error, but reduces the sampled event rate (and therefore allows faster counting/estimation for a given maximum update rate λ, and/or allows a smaller rate adaptation queue 34). To keep the rate adaptation queue 34 stable, in an embodiment, the control parameter Q is bounded according to $$Q > L_{min}/\rho, \quad \text{(Equation 2)}$$

where $L_{min}$ is the minimum event size (e.g., a minimum packet length, such as 64 bytes for Ethernet packets), and where ρ is related to the maximum update rate μ as follows:

$$\rho=\mu/\lambda_{max} \quad \text{(Equation 3)}$$

In an embodiment, $\lambda_{max}$ is the maximum of the event rate λ(t), and/or corresponds to the event rate when network device 12 is operating at its theoretical maximal bandwidth. Moreover, in some embodiments, $\lambda_{max}$ corresponds to the scenario in which all events in a given time interval have the minimum event size (e.g., in which all Ethernet packets have a length of 64 bytes, in one embodiment). In some embodiments, sampling unit 30 utilizes the same sampling policy regardless of whether events (e.g., packets) or event sizes (e.g., byte counts) are being estimated.

In one embodiment of the second technique in which dual-mode counter module 10 counts/estimates event sizes (e.g., packet bytes), and in which each of counters 22-1 through 22-M stores an exact counter value representation, update unit 36 updates/increments the count value of the appropriate one of counters 22-1 through 22-M according to the formula:

$$C_{size}(L)+=(Q,L/Q<1 \text{ AND event sampling was probabilistic}), \text{ OR } (L, \text{otherwise}) \quad \text{(Equation 4)}$$

In one embodiment of the second technique in which dual-mode counter module 10 counts/estimates events (e.g., packets), and in which each of counters 22-1 through 22-M stores an exact counter value representation, update unit 36 updates/increments the count value of the appropriate one of counters 22-1 through 22-M according to the formula:

$$C_{event}(L)+=(Q/L, L/Q<1 \text{ AND event sampling was probabilistic}), \text{ OR } (1, \text{otherwise}) \quad \text{(Equation 5)}$$

In some embodiments in which update unit 36 operates according to Equation 4 or Equation 5, update unit 36 determines whether L/Q is less than one based on information, stored with the sampled event in rate adaptation queue 34, indicating whether sampling was statistical. In one embodiment and scenario in which sampling unit 30 samples an event according to Equation 1, for example, the use of statistical sampling means that L/Q is less than one for that event. Moreover, in some embodiments, update unit 36 determines L based on information, stored with the sampled event in rate adaptation queue 34, indicating the event size. Further, in some embodiments where Q is dynamically adjusted, update unit 36 determines Q based on information, stored with the sampled event in rate adaptation queue 34, indicating the current value of Q. In an embodiment, if the load is low (according to the load determination circuit 32) then all packets are sampled.

In an embodiment in which counters 22-1 through 22-M utilize inexact count values for space efficiency, update unit 36 increments the appropriate counter using a different update policy. In one embodiment in which each of counters 22-1 through 22-M stores a truncated counter value representation that truncates the n least significant bits of the value, for example, update unit 36 updates/increments the counter value according to the formula:

$$C+=L \text{ div } 2^n+(1 \text{ with probability } (L \text{ mod } 2^n)/2^n, \text{ or } 0 \text{ otherwise}) \quad \text{(Equation 6)}$$

where L represents the value to be added to the counter. In another embodiment, in which each of counters 22-1 through 22-M stores a counter value as a mantissa/exponent representation, update unit 36 updates/increments the count value according to any suitable update policy described in U.S. patent application Ser. No. 13/744,093.

Figure 2:
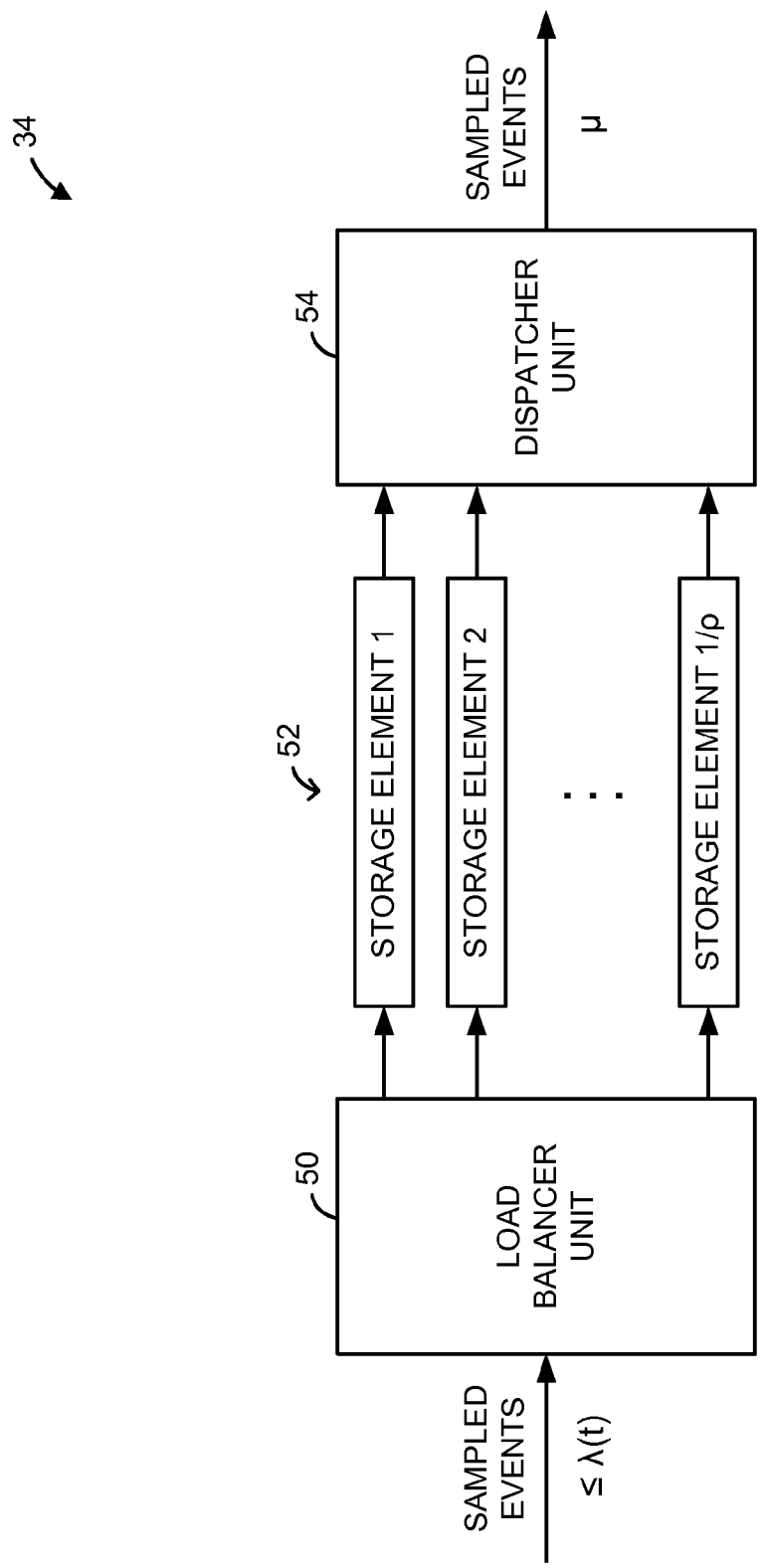
FIG. 2 is a more detailed block diagram of the rate adaptation queue of FIG. 1, according to an embodiment.

As noted above, the sampling process performed by sampling unit 30 can, at times, generate bursts of samples at an instantaneous rate that exceeds the maximum update rate $\mu$, and the buffering performed by rate adaptation queue 34 serves to reduce the probability that a sampled event will be lost and go uncounted (thereby increasing estimation error). Generally, queue size can be increased to decrease the probability of losing a sampled event. In some embodiments, however, rate adaptation queue 34 is implemented using a relatively expensive, high-speed memory (e.g., an SRAM with sufficient port count and frequency to support a suitable read rate and a suitable write rate), and so it is desirable that the queue size be minimized. In other embodiments, a relatively inexpensive (and slow) memory is used, such as DRAM or SRAM, to allow a larger queue size. FIG. 2 is a block diagram of the rate adaptation queue 34 of FIG. 1, according to one embodiment in which a relatively slow memory is used to buffer sampled events. In some embodiments, the size of rate adaptation queue 34 is designed based on the parameters $P_{loss}$ and Q. In an embodiment, $P_{loss}$ is the probability that a sampled event is lost (and therefore not counted or used to estimate a count), and reflects the burst absorption capability of rate adaptation queue 34, while Q (the control parameter introduced above) affects the load sensing performed by load determination circuit 32. For example, to prevent false detection of a heavy traffic load, in an embodiment, Q is set larger than the parallelism factor of the arriving events. The "parallelism factor" refers to the number of independent event generators (e.g., the number of ingress ports on which packets are received, in an embodiment). In an embodiment, temporal synchronization among the event generators can result in a burst of events that is erroneously interpreted as a heavy traffic load. In an embodiment, Q is set such that Equations 2 and 3 are satisfied, with the required size for rate adaptation queue 34 generally decreases as Q increases.

In the embodiment of FIG. 2, rate adaptation queue 34 includes a load balancer unit 50, storage elements 52, and a dispatcher unit 54. In an embodiment, each of storage elements 52 uses a relatively slow memory (e.g., slower than $\lambda_{max}$), such as DRAM or SRAM. Load balancer unit 50 distributes sampled events among the storage elements 52, and dispatcher unit 54 selects events from the storage elements 52 to be provided to update unit 36 (FIG. 1), in an embodiment. In some embodiments, to meet the performance requirements described above, load balancer unit 50 operates at the maximum event rate $\lambda_{max}$ (or higher), there are $1/\rho$ ($=\mu/\lambda_{max}$) storage elements 52 in parallel (e.g., rounding up to achieve an integer number of elements), and dispatcher unit 54 operates at the maximum update rate $\mu$ (or higher). Moreover, in one such embodiment, the size of each of storage elements 52 is at least $\rho \times K$, where K is the size of rate adaptation queue 34. A suitable size of the rate adaptation queue can be determined using a suitable technique such as those known to ones of ordinary skill in the art. In some embodiments, the load balancing and dispatching policies are coordinated to prevent overflow of a particular storage element, and to prevent starvation of sampled events. In one embodiment, for example, first in first out (FIFO) policies are used by load balancer unit 50 and/or dispatcher unit 54.

Figure 3:
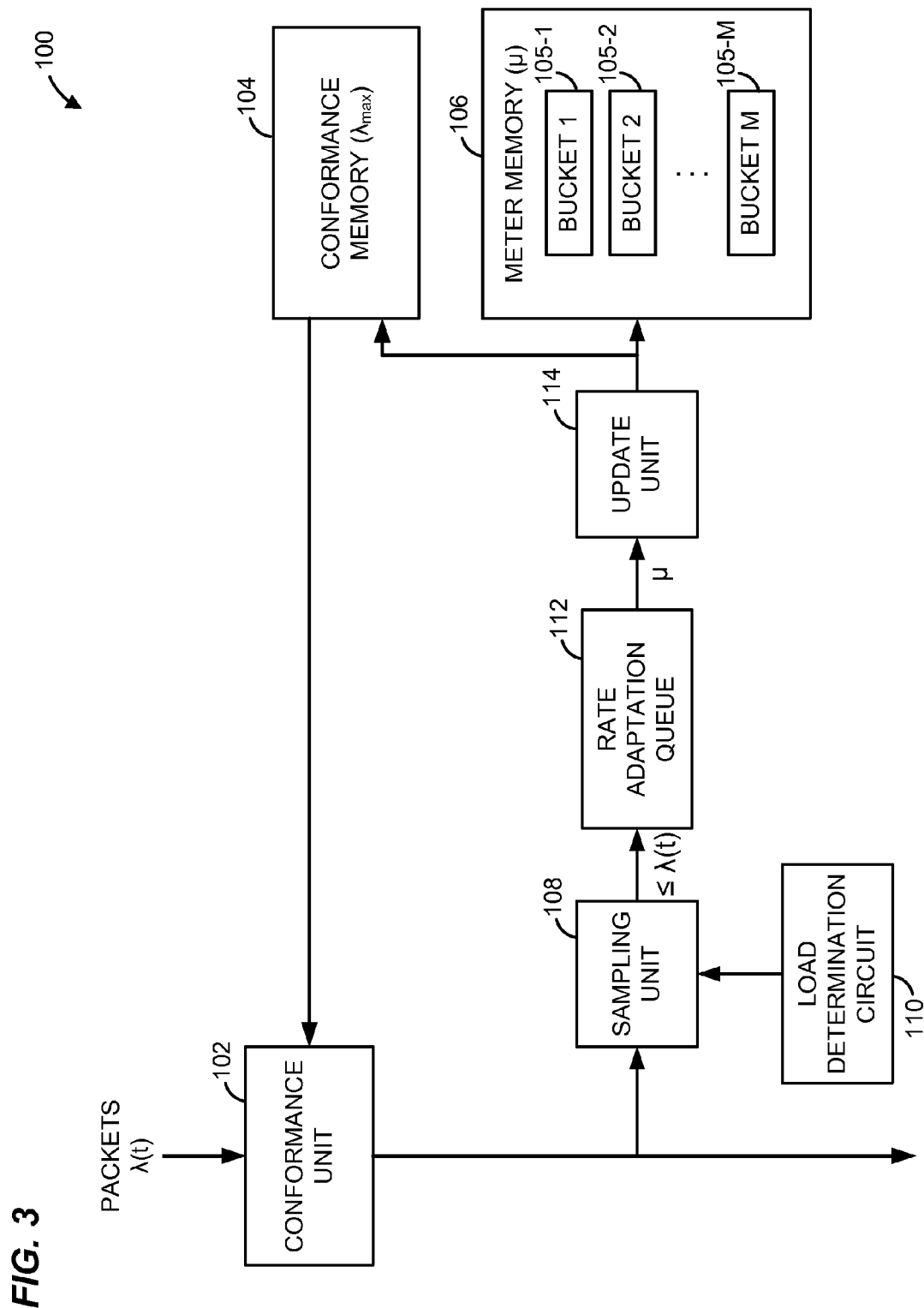
FIG. 3 is a block diagram of an example meter module that utilizes metering techniques of the present disclosure, according to an embodiment.

The first technique and/or the second technique described above is/are used for various different applications, in different embodiments. In some embodiments, for example, one or both techniques are used for a metering application. FIG. 3 is a block diagram of an example meter module 100 that utilizes such techniques, according to an embodiment.

In an embodiment, meter module 100 is included in a network device similar to network device 12 (FIG. 1), and generally determines whether each packet, of packet traffic arriving at an instantaneous rate $\lambda(t)$, conforms to the metering policy of a respective one of the meters supported by meter module 100. In one embodiment, the metering policies of at least some of the meters supported by meter module 100 are set based on a service level agreement (SLA).

The meter module 100 includes a conformance unit 102 that, in some embodiments, classifies each received packet as corresponding to either a "conforming" state or a "non-conforming" state. To properly classify packets, in an embodiment, conformance unit 102 accesses a conformance memory 104 storing conformance indicators for the various meters. In an embodiment, the conformance state for a particular meter depends on a number of tokens in a respective one of token buckets 105-1 through 105-M stored in a meter memory 106, or on whether the number of tokens is positive or negative. In some embodiments, meter memory 106 is a DRAM, an SRAM (e.g., an embedded SRAM), or any another suitable memory, that is separate from conformance memory 104. In various embodiments, the number of tokens in each of token buckets 105-1 through 105-M is represented as an exact value, or as an inexact (e.g., truncated or mantissa/exponent) value. In one embodiment, conformance unit 102 performs conformance checks according to the procedure defined by Internet Engineering Task Force (IETF) Request for Comments (RFC) 2698. In other embodiments, the conformance unit 102 performs conformance checks, additionally or alternatively, according to other suitable techniques such as those described in IETF RFC 2697, Metro Ethernet Forum MEF 10.1, using multi-level meters, multi-priority buckets (e.g., MEF 10.3) structure related multi-hierarchical meters, etc. In an embodiment, the conformance unit 102 utilizes two token buckets to enforce SLA. In an embodiment, the conformance unit 102 utilizes a single token bucket.

In an embodiment, conformance unit 102 accesses (reads) conformance memory 104 at a rate that corresponds to at least a maximum rate, $\lambda_{max}$, of the network device that includes meter module 100. While the speed of conformance memory 104 in some embodiments requires a relatively expensive type of memory (e.g., an SRAM with sufficient port count and frequency to support a suitable read rate and a suitable write rate), very few bits are generally required to represent each conformance state, and therefore very little memory is required per meter, in an embodiment. In one embodiment in which each of token buckets 105-1 through 105-M corresponds to a single-rate meter, for example, conformance memory 104 stores only a single bit per meter/conformance state to indicate conformance or non-conformance with the respective rate limit. In an embodiment, when having an event driven (sampled) update process all packets, both conforming and non-conforming, are subject to the sampling process. In an embodiment, a dual token bucket technique is utilized and all packets are sampled using a same policy and regardless of conformance level to help ensure that token buckets are being constantly refreshed and that the dual token bucket is updated by both GREEN and YELLOW packets, e.g., corresponding to respective rate limits.

On the other hand, in another embodiment, conformance unit 102 makes a packet available for possible sampling by a sampling unit 108 when the applicable conformance state indicates that the single rate is not currently being exceeded, and drops all packets (or implements another suitable policy) when the applicable conformance state indicates that the single rate has been met or exceeded. In one embodiment in which each of token buckets 105-1 through 105-M corresponds to a two-rate meter, conformance memory 104 stores two bits per meter/conformance state to indicate a level of conformance with the respective rate limits (e.g., "green," "yellow" or "red" conformance states). In one such embodiment, conformance unit 102 makes a packet available for possible sampling by sampling unit 108 when the applicable conformance state is "green" or "yellow," and drops all packets (or implements another suitable policy) when the applicable conformance state is "red."

In the example embodiment of FIG. 3, update unit 114 accesses meter memory 106 to update the numbers of tokens, stored in token buckets 105-1 through 105-M, based on the events sampled by sampling unit 108. In one embodiment, update unit 114 can access/update meter memory 106 at rates up to a maximum update rate $\mu$, where $\mu < \lambda_{max}$. In an embodiment, update unit 114 performs updates according to the procedure defined by IETF RFC 2698. In other embodiments, the update unit 114 performs updates, additionally or alternatively, according to other suitable techniques such as those described in IETF RFC 2697, Metro Ethernet Forum MEF 10.1, using multi-level meters, multi-priority buckets (e.g., MEF 10.3) structure related multi-hierarchical meters, etc. In an embodiment, the conformance unit 102 utilizes two token buckets to enforce SLA. In an embodiment, the conformance unit 102 utilizes a single token bucket. In some embodiments, each of token buckets 105-1 through 105-M intermittently receives a number of new tokens that corresponds to the permitted rate of traffic for the respective meter. In an embodiment, meter module 100 maintains a time stamp of the last time that the number of tokens in a given bucket was updated by update unit 114 and, when a new packet is sampled and results in that bucket again being updated, the number of tokens is incremented by an amount determined based on the time elapsed since the time indicated by the time stamp. In an embodiment, the time stamp is stored in the bucket memory 106, per bucket or group of buckets. In another embodiment, the time stamp is stored in internal SRAM in 114. In an embodiment, since the time stamp is relatively a large number of bits, the time stamp is stored in a more efficient memory like slow SRAM or DRAM.

In an embodiment, update unit 114 not only updates the number of tokens in token buckets 105-1 through 105-M, but also accesses (e.g., reads/modifies/writes to) the conformance memory 104 to update the stored conformance state for a given meter when the number of tokens in the corresponding one of token buckets 105-1 through 105-M goes to a negative value. In an embodiment, the update unit 114 accesses (e.g., reads/modifies/writes to) the conformance memory 104 to set the conformance state based on bucket level relative one WM, or several WM (e.g., for multi-level buckets). In an embodiment, the update unit 114 accesses (e.g., reads/modifies/writes to) the conformance memory 104 to set the conformance state reflecting a current bucket level relative to a maximum bucket level. (e.g., in %) to adapt the sampling 108 mechanism. In an embodiment, conformance memory 104 is sufficiently fast to be read at a rate that is at least equal to $\lambda_{max}+\mu$ (to handle conformance check read operations from conformance unit 102, and read operations from update unit 114, in a worst case scenario), and to be written to at a rate that is at least equal to $\mu$ (to handle updates from update unit 114 in a worst case scenario). In another embodiment, the number of new tokens for a given bucket is fixed, and is added at each of a plurality of fixed length time intervals.

In some embodiments, at least load determination circuit 110 is omitted, and meter module 100 uses conventional statistical estimation. In other embodiments, sampling unit 108, load determination circuit 110, rate adaptation unit 112 and/or update unit 114 are the same as or similar to sampling unit 30, load determination circuit 32, rate adaptation unit 34 and/or update unit 36, respectively, of FIG. 1, and implement the first technique and/or the second technique substantially as described above in connection with FIG. 1. In another embodiment, the sampling unit 108 uses information about the current bucket level stored in memory 104 to determine Q, thus reducing the overall sampling load by sampling with less probability when the bucket level is close to maximum level.

In one embodiment in which update unit 114 is similar to update unit 36, however, the appropriate one of token buckets 105 is updated/decremented according to $$\text{Token Bucket}_{size} -= (Q, L/Q<1), \text{ or } (L, \text{otherwise}) \quad \text{(Equation 7)}$$

if event sizes (e.g., bytes of arriving packets) are metered, or according to $$\text{Token Bucket}_{event} -= (Q/L, L/Q<1), \text{ or } (1, \text{otherwise}) \quad \text{(Equation 8)}$$

if events (e.g., packet arrivals) are metered. In another embodiment, where update unit 114 is similar to update unit 36, and token buckets 105-1 through 105-M use a truncated representation of the number of tokens, the appropriate one of token buckets 105 is updated according to $$\text{Token Bucket} -= L \text{ div } 2^n + (1 \text{ with probability } (L \text{ mod } 2^n)/2^n, \text{ or } 0 \text{ otherwise}) \quad \text{(Equation 9)}$$

where n is the number of truncated least significant bits and L represents the value to subtract from the counter.

Figure 4:
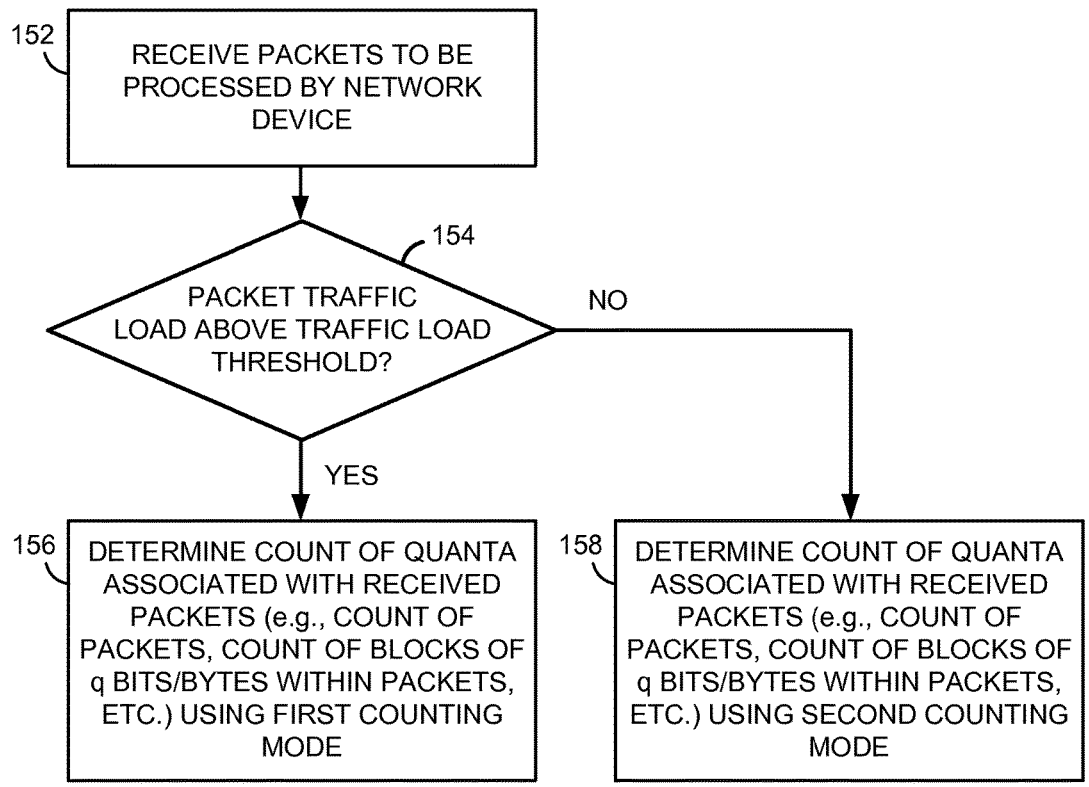
FIG. 4 is a flow diagram of an example method of counting events in a network device, according to an embodiment.

FIG. 4 is a flow diagram of an example method 150 for counting events in a network device, according to an embodiment. In an embodiment, the method 150 is implemented in a network device, such as network device 12 (FIG. 1), for example.

At block 152, packets to be processed by the network device implementing the method 150 are received. In an embodiment, the packets are received via one or more ingress interfaces, such as one or more interfaces among interfaces 14 (FIG. 1), for example.

At block 154, it is determined whether a packet traffic load of the network device implementing the method 150 is above a traffic load threshold. In an embodiment, block 154 is implemented by a load determination circuit, such as load determination circuit 32 (FIG. 1), for example. In one embodiment, the determination at block 154 is made based on an amount of sampled events associated with the received packets (e.g., a fill-level of a queue, such as rate adaptation queue 34 of FIG. 1), and/or based on a state of a meter configured to monitor a rate of events associated with the received packets prior to any sampling of those events.

If it is determined at block 154 that the packet traffic load is above the traffic load threshold, flow proceeds to block 156. At block 156, in response to the determination at block 154, a count of quanta associated with the packets received at block 152 is determined using a first counting mode. If it is instead determined at block 154 that the packet traffic load is not above the traffic load threshold, flow proceeds to block 158. At block 158, in response to the determination at block 154, a count of quanta associated with the packets received at block 152 is determined using a second counting mode that is different than the first counting mode. As used herein, "determining a count . . . " may be used to refer to determining an exact count, determining an estimated count, or some mix of both. In an embodiment, blocks 156 and 158 are implemented by a sampling unit, such as sampling unit 30 (FIG. 1), for example.

In one embodiment, the quanta for which a count is determined at block 156, and the quanta for which a count is determined at block 158, is a single packet of the received packets. In another embodiment, the quanta is a block of length q within the received packets, where q is an integer greater than or equal to one. In various embodiments, for example, the quanta is a single packet byte (q=1), a block of bytes equal to a minimum packet length (e.g., q=64 for Ethernet packets), or any other suitable block of bits, bytes, or other units of data within the received packets.

In some embodiments, the first counting mode used at block 156 and the second counting mode used at block 158 are sampling modes of the counter implementing the method 150. In one embodiment, for example, the first counting mode is a statistical sampling mode in which events associated with the received packets (e.g., arrivals of the packets) are sampled according to some probability P that is less than one but greater than zero, and the second counting mode is a deterministic sampling mode in which every event (or one event every x events, etc.) is sampled with probability one.

In some embodiments, the method 150 includes one or more additional blocks not seen in FIG. 4. In one embodiment, for example, the method 150 includes a first additional block, at least in part subsequent to block 156, in which the count of quanta determined using the first counting mode is stored in a counter memory using exact value representations, and a second additional block, at least in part subsequent to block 158, in which the count of quanta determined using the second counting mode is stored in the counter memory also using exact value representations. In another example embodiment, the method 150 includes a first additional block, at least in part subsequent to block 156, in which the count of quanta determined using the first counting mode is stored in a counter memory using inexact value representations (e.g., truncated or mantissa/exponent representations), and a second additional block, at least in part subsequent to block 158, in which the count of quanta determined using the second counting mode is stored in the counter memory also using the inexact value representations.

In some embodiments, some or all of the blocks seen in FIG. 4 do not occur in discrete steps. In one embodiment, for example, different packets of the packets received at block 152 are received over a period of time such that blocks 152, 154, 156 and 158 occur substantially in parallel (e.g., with block 156 or block 158 being performed on a first packet while block 152 and/or 154 is performed for a subsequent, second packet).

Figure 5:
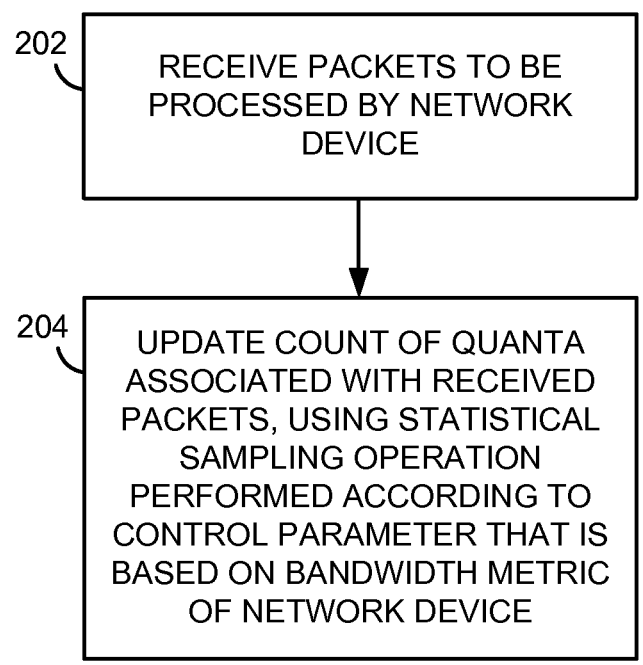
FIG. 5 is a flow diagram of another example method of counting events in a network device, according to an embodiment.

FIG. 5 is a flow diagram of another example method 200 for counting events in a network device, according to an embodiment. In an embodiment, the method 200 is implemented in a network device, such as network device 12 (FIG. 1), for example.

At block 202, packets to be processed by the network device implementing the method 200 are received from a network. In an embodiment, the packets are received via one or more ingress interfaces, such as one or more interfaces among interfaces 14 (FIG. 1), for example.

At block 204, a count of quanta associated with the packets received at block 202 is updated using a statistical sampling operation that is performed according to a control parameter that is based on a bandwidth metric of the network device implementing the method 200. In an embodiment, block 204 is implemented in a counter module, such as dual-mode counter 10 (FIG. 1), for example. In one embodiment, the quanta for which a count is updated is a single packet of the received packets. In another embodiment, the quanta is a block of length q within the received packets, where q is an integer greater than or equal to one. In various embodiments, for example, the quanta is a single packet byte (q=1), a block of bytes equal to a minimum packet length (e.g., q=64 for Ethernet packets), or any other suitable block of bits, bytes, or other units of data within the received packets.

In some embodiments, the bandwidth metric on which the control parameter is based is a maximal theoretical event rate of the network device implementing the method 200. In one such embodiment, the control parameter is bounded by a function of the maximal theoretical event rate of the network device (e.g., according to Equations 2 and 3 above, in one embodiment). In one embodiment, the control parameter is a fixed value that is initially set to achieve the desired performance trade-offs (e.g., estimation error, sampled event rate, queue size, etc.). In an alternative embodiment, the control parameter is dynamically calculated (e.g., based on current packet traffic load conditions).

In some embodiments, the statistical sampling operation performed at block 204 samples events associated with the received packets (e.g., samples arrivals of the packets) according to a probability P that is calculated based on the control parameter. In one such embodiment, the probability P is always greater than zero but less than one. In another embodiment (e.g., where the sampling policy operates according to Equation 1 above, Q being the control parameter), the probability P can at times be equal to one depending on the packet lengths and/or other suitable parameters.

In some embodiments, some or all of the blocks seen in FIG. 5 do not occur in discrete steps. In one embodiment, for example, different packets of the packets received at block 202 are received over a period of time such that blocks 202 and 204 occur substantially in parallel. Moreover, in some embodiments, the method 200 is implemented in conjunction with the method 150. In one such embodiment, block 204 replaces, or is included within, block 156 of the method 150.

Figure 6:
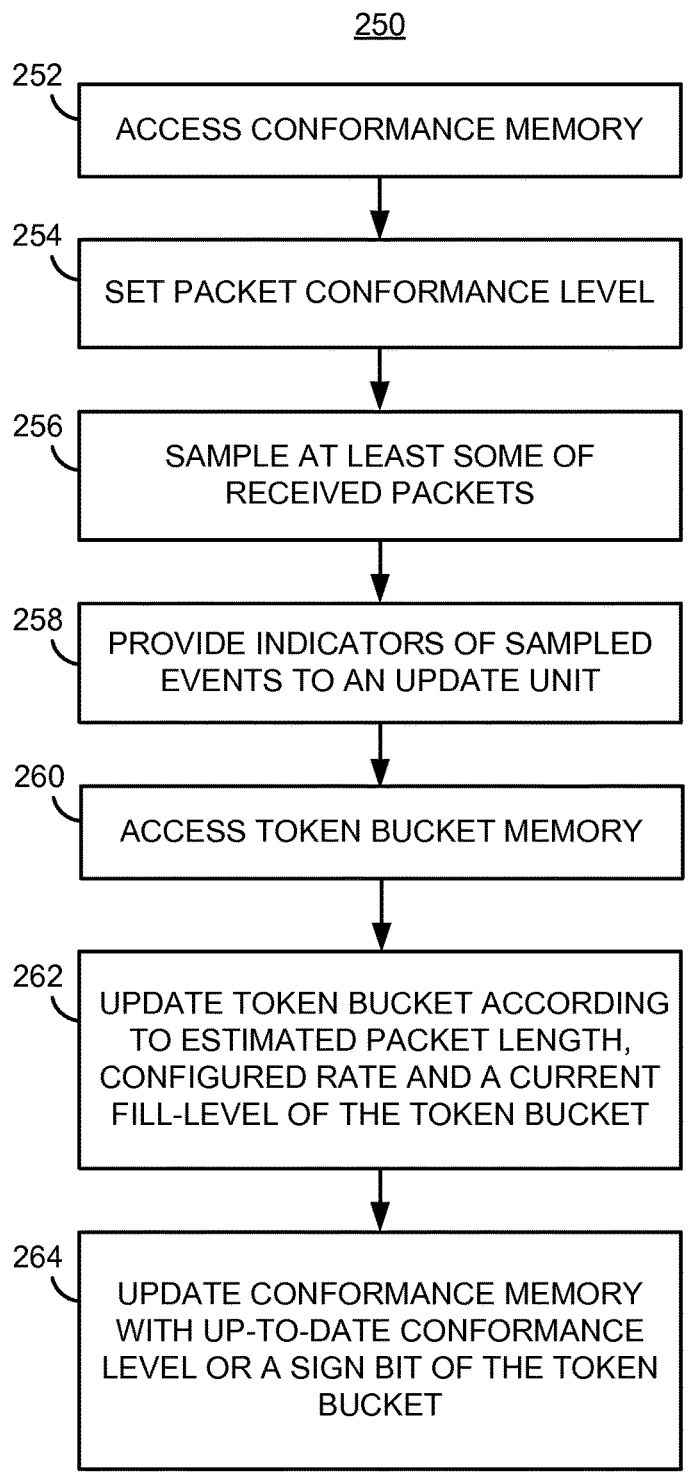
FIG. 6 is a flow diagram of an example method of metering traffic in a network device, according to an embodiment.

FIG. 6 is a flow diagram of an example method 250 for metering traffic in a network device, according to an embodiment. In an embodiment, the method 250 is implemented in a network device, such as network device 12 of FIG. 1, for example.

At block 252, a conformance memory storing a conformance indicator is accessed. The conformance indicator indicates whether a permitted rate of packet traffic has been exceeded. In an embodiment, the conformance memory is similar to conformance memory 104 (FIG. 3). At block 254, a packet conformance level is set for each packet received at the network device. For example, in an embodiment, packets received at the network device implementing the method 250 are classified based on the conformance indicator. In an embodiment, blocks 252 and 254 are implemented by a conformance unit, such as conformance unit 102 (FIG. 3), for example.

At block 256, at least some of the received packets are sampled. In one embodiment, conforming packets (according to the classification at block 254) are statistically sampled, and no non-conforming packets (again, according to the classification at block 254) are sampled. In another embodiment, events associated with conforming packets that fall below a packet length threshold are statistically sampled, all events associated with conforming packets that do not fall below the packet length threshold are sampled, and no events associated with non-conforming packets are sampled. At block 258, indicators of the sampled events are provided (e.g., directly to an update unit such as update unit 114 of FIG. 3, or indirectly via a queue such as rate adaptation queue 112 of FIG. 3, in various embodiments). In an embodiment, blocks 256 and 258 are implemented by a sampling unit, such as sampling unit 30 (FIG. 1) or sampling unit 108 (FIG. 3), for example.

At block 260, a token bucket memory is accessed. In an embodiment, the token bucket memory is separate from the conformance memory. In another embodiment, the token bucket memory is in a same physical memory as the conformance memory.

At block 262, at least based on the indicators provided at block 258, a number of tokens stored in the token bucket memory are updated. In an embodiment, the token bucket memory is similar to one of token buckets 105-1 through 105-M in meter memory 106 (FIG. 3). In an embodiment, block 262 includes updating a token bucket based on an estimated packet length (e.g., L), a configured rate, and a current fill level of the token bucket.

At block 264, the conformance memory is accessed to update the conformance indicator when the updated number of tokens indicates that the permitted rate of packet traffic has been exceeded. In an embodiment, block 264 comprises updating the conformance memory with an up-to-date conformance level and/or a sign bit of a token bucket. In an embodiment, blocks 260, 262, and 264 are implemented by an update unit, such as update unit 36 (FIG. 1) or update unit 114 (FIG. 3), for example.

In an embodiment, the conformance memory is accessed at block 252 at up to a first rate (e.g., up to at least a maximum event rate of the network device implementing the method 250, depending on the traffic load), and the token bucket memory is accessed at up to a second rate lower than the first rate (e.g., up to a rate that is less than the maximum event rate of the network device, depending on the traffic load).

In some embodiments, the method 250 includes one or more additional blocks not seen in FIG. 6. In one embodiment, for example, the method 250 includes an additional block in which a number of tokens is intermittently received at the token bucket memory, with each number of tokens corresponding to the permitted rate of packet traffic. In one such embodiment, the tokens are periodically received according to a fixed time interval, and a fixed number of tokens are added to the token bucket for each time interval. In an alternative embodiment, tokens are added when a packet arrives (and is sampled) based on a length of the packet and a time stamp indicating when the token bucket was last updated.

In some embodiments, some or all of the blocks seen in FIG. 6 do not occur in discrete steps. In one embodiment in which different packets are received over a period of time, for example, blocks 252, 254, 256, 258, 260 and 262 occur substantially in parallel.

In some embodiments, at least portions of the counters/estimators described above are implemented in hardware or firmware. For example, the counter memory 20, sampling unit 30, load determination circuit 32, rate adaptation queue 34, and/or update unit 36 of FIG. 1 are implemented in hardware, allowing the dual-mode counter module 10 to count/estimate events (e.g., packets or bytes) in real time and at wire speed, in an embodiment. As another example, in an embodiment, the conformance unit 102, conformance memory 104, meter memory 105, sampling unit 108, load determination circuit 110, rate adaptation queue 112, and/or update unit 114 of FIG. 3 are implemented in hardware, allowing the meter module 100 to count/estimate events (e.g., packets or bytes) for metering in real time and at wire speed, in an embodiment. In some embodiments, the blocks, operations, techniques, etc., are implemented in, for example, a custom integrated circuit (IC), an application specific integrated circuit (ASIC), a programmable logic device (PLD), a field programmable logic array (FPGA), a programmable logic arrays (PLA), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed:

1. A network device comprising:
   a plurality of interfaces configured to receive, from a network, packets to be processed by the network device;
   a load determination circuit configured to determine whether a rate at which events associated with the received packets occur exceeds a maximum update rate at which a counter associated with a memory of the network device is able to be updated; and
   a dual-mode counter module configured to (i) estimate a count of quanta associated with the received packets without counting every event using a first counting mode, which uses non-deterministic sampling, in response to the load determination unit determining that the rate at which events associated with the received packets occur exceeds the maximum update rate, and (ii) determine a count of quanta associated with the received packets using a second counting mode, which uses deterministic sampling in response to the load determination unit determining that the rate at which events associated with the received packets occur is less than the maximum update rate.

2. The network device of claim 1, wherein the first counting mode uses statistical sampling of events associated with the received packets.

3. The network device of claim 2, wherein the dual-mode counter module is configured to store the determined counts of quanta in a counter memory using exact value representations.

4. The network device of claim 2, wherein the dual-mode counter module is configured to store the determined counts of quanta in a counter memory using truncated representations or mantissa-exponent representations.

5. The network device of claim 1, wherein the load determination circuit is configured to determine whether the rate at which events associated with the received packets occur exceeds the maximum update rate based on one or both of (i) an amount of sampled events associated with the received packets, and (ii) a state of a meter configured to monitor the rate at which events associated with the received packets occur prior to sampling.

6. The network device of claim 1, wherein the dual-mode counter module is configured to:
   estimate the count of quanta associated with the received packets using the first counting mode by determining (i) a count of packets within the received packets using the first counting mode, or (ii) a count of blocks of length q within the received packets using the first counting mode, q being an integer greater than or equal to one; and determine the count of quanta associated with the received packets using the second counting mode by determining (i) a count of packets within the received packets using the second counting mode, or (ii) a count of blocks of length q within the received packets using the second counting mode.

7. A method for counting events in a network device, the method comprising:

receiving, from a network, packets to be processed by the network device;

determining whether a rate at which events associated with the received packets occur exceeds a maximum update rate at which a counter associated with a memory of the network device is able to be updated;

responsively to determining that the rate at which events associated with the received packets occur exceeds the maximum update rate, estimating a count of quanta associated with the received packets without counting every event using a first counting mode that uses non-deterministic sampling; and responsively to determining that the rate at which events associated with the received packets occur is less than the maximum update rate, determining a count of quanta associated with the received packets using a second counting mode that uses deterministic sampling.

8. The method of claim 7, wherein:

estimating the count of quanta associated with the received packets using the first counting mode includes using statistical sampling of events associated with the received packet.

9. The method of claim 8, further comprising:

storing the determined counts of quanta in the memory using exact value representations.

10. The method of claim 8, further comprising:

storing the determined counts of quanta in the memory using truncated representations or mantissa/exponent representations.

11. The method of claim 7, wherein determining whether the rate at which events associated with the received packets occur exceeds the maximum update rate is based on one or both of (i) an amount of sampled events associated with the received packets, and (ii) a state of a meter configured to monitor the rate at which events associated with the received packets occur prior to sampling.

12. The method of claim 7, wherein:

estimating the count of quanta associated with the received packets using the first counting mode includes determining (i) a count of packets within the received packets using the first counting mode, or (ii) a count of blocks of length q within the received packets using the first counting mode, q being an integer greater than or equal to one; and determining the count of quanta associated with the received packets using the second counting mode includes determining (i) a count of packets within the received packets using the second counting mode, or (ii) a count of blocks of length q within the received packets using the second counting mode.

13. A network device comprising:

a plurality of interfaces configured to receive, from a network, packets to be processed by the network device; and a counter module configured to estimate, using a statistical sampling operation, a count of quanta associated with packets received via the plurality of interfaces, the statistical sampling operation being performed according to a control parameter that is bounded based on i) a bandwidth metric of the network device and ii) a maximum update rate at which a counter associated with a memory of the network device is able to be updated.

14. The network device of claim 13, wherein the bandwidth metric is a maximal theoretical event rate of the network device.

15. The network device of claim 14, wherein the control parameter is bounded by a function of i) the maximum update rate at which the counter is able to be updated, and ii) a maximal theoretical event rate of the network device.

16. The network device of claim 13, wherein the statistical sampling operation samples events associated with the received packets according to a probability that is calculated based on the control parameter.

17. The network device of claim 13, wherein the statistical sampling operation samples events associated with the received packets according to a probability that is calculated based on (i) the control parameter and (ii) lengths of the packets received via the plurality of interfaces.

18. The network device of claim 13, wherein the statistical sampling operation samples all events associated with those packets, of the received packets, having a length greater than a threshold length.

19. The network device of claim 13, wherein the counter module is configured to estimate the count of quanta associated with the received packets by estimating (i) a count of packets within the received packets, or (ii) a count of blocks of length q within the received packets.

20. A method for counting events in a network device, the method comprising:

receiving, from a network, packets to be processed by the network device; and estimating, using a statistical sampling operation performed according to a control parameter that is bounded based on i) a bandwidth metric of the network device and ii) a maximum update rate at which a counter associated with a memory of the network device is able to be updated, a count of quanta associated with the received packets.

21. The method of claim 20, wherein estimating the count of quanta includes estimating the count of quanta using a statistical sampling operation performed according to a control parameter that is based on a maximal theoretical event rate of the network device.

22. The method of claim 21, wherein estimating the count of quanta includes estimating the count of quanta using a statistical sampling operation performed according to a control parameter that is bounded by a function of i) the maximum update rate at which the counter is able to be updated, and ii) a maximal theoretical event rate of the network device.

23. The method of claim 20, wherein estimating the count of quanta includes estimating the count of quanta using a statistical sampling operation that samples events associated with the received packets according to a probability that is calculated based on the control parameter.

24. The method of claim 20, wherein estimating the count of quanta includes estimating the count of quanta using a statistical sampling operation that samples events associated with the received packets according to a probability that is calculated based on (i) the control parameter and (ii) lengths of the received packets.

25. The method of claim 1, wherein the maximum update rate i) is lower than a true maximum update rate at which the counter associated with a memory of the network device is able to be updated, and ii) is set to provide a particular level of reliability.

\* \* \* \* \*